(12) United States Patent
Sakamoto et al.

(10) Patent No.: US 7,483,953 B2
(45) Date of Patent: Jan. 27, 2009

(54) EFFICIENT DOWNLOADING OF CONTENT DATA VIA NETWORK

(75) Inventors: Takuya Sakamoto, Kawasaki (JP); Takushi Fujita, Kawasaki (JP); Toru Kamiwada, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 988 days.

(21) Appl. No.: 10/802,929

(22) Filed: Mar. 18, 2004

(65) Prior Publication Data
US 2005/0022133 A1  Jan. 27, 2005

Related U.S. Application Data

(63) Continuation of application No. PCT/JP01/08431, filed on Sep. 27, 2001.

(51) Int. Cl.
*G06F 15/16* (2006.01)
*G06F 3/048* (2006.01)

(52) U.S. Cl. .............. 709/207; 715/782; 715/848

(58) Field of Classification Search ......... 709/203–204, 709/206, 207, 217; 715/234, 238, 243–252, 715/757, 848, 782, 804, 805
See application file for complete search history.

(56) References Cited

U.S. PATENT DOCUMENTS

| | | | |
|---|---|---|---|
| 6,055,563 A * | 4/2000 | Endo et al. ............... | 709/203 |
| 6,243,091 B1 * | 6/2001 | Berstis ..................... | 715/234 |
| 6,650,343 B1 * | 11/2003 | Fujita et al. ............... | 715/760 |
| 2002/0105551 A1 * | 8/2002 | Kamen et al. ............. | 345/850 |

FOREIGN PATENT DOCUMENTS

| | | |
|---|---|---|
| JP | 10-275247 | 10/1998 |
| JP | 11-110399 | 4/1999 |
| JP | 2000-172248 | 6/2000 |
| JP | 2001-148033 | 5/2001 |

* cited by examiner

*Primary Examiner*—Paul H Kang
(74) *Attorney, Agent, or Firm*—Staas & Halsey LLP

(57) ABSTRACT

An information processing apparatus displays a plurality of linked items of content in a virtual space in accordance with field-of-view data. The information processing apparatus includes: first capturing means (S524, S526) for capturing link description data; second capturing means (S512) for capturing content data associated with the description of an item of content contained in the captured link description data; image generating means (S530, S532) for generating an image of the item of content to be disposed in the virtual space, in accordance with the captured content data; and determining means for determining further data to be captured next in accordance with a condition contained in the captured link description data.

17 Claims, 11 Drawing Sheets

File: example1.xml

<Image position-x="10" position-y="20" position-z="30" rotation="40.0" tilt="50.0" size-x="70" size-y="80" source="http://www.fujitsu.com/ex/picture1.jpg"/>

<Link position-x="200" position-y="210" position-z="220" rotation="10.0" tilt="20.0" scale="0.5" source="http://www.fujitsu.com/ex/example2.xml"/>

FIG. 6

File: example3.xml

```
<Level distmax="200" distmin="0">

<Link position-x="10" position-y="20" position-z="30"
    rotation="40.0" tilt="50.0" scale="80"
    source="http://www.fujitsu.com/ex/example6.xml"/>

<SubLink position-x="10" position-y="20" position-z="30"
    rotation="40.0" tilt="50.0" scale="80"
    source="http://www.fujitsu.com/ex/example6mini.xml"/>

</Level>
```

FIG. 8

File: example4.xml

```
<Group>

<Link position-x="10" position-y="20" position-z="30"
    rotation="40.0" tilt="50.0" scale="80" order="0"
    source="http://www.fujitsu.com/ex/example7a.xml"/>

<Link position-x="10" position-y="20" position-z="30"
    rotation="40.0" tilt="50.0" scale="80" order="1"
    source="http://www.fujitsu.com/ex/example7b.xml"/>

<Link position-x="10" position-y="20" position-z="30"
    rotation="40.0" tilt="50.0" scale="80" order="2"
    source="http://www.fujitsu.com/ex/example7c.xml"/>

</Group>
```

FIG. 9

File: example5.xml

```
<ViewPoint position-x="50" position-y="50" position-z="50"/>
```

FIG. 10

EFFICIENT DOWNLOADING OF CONTENT DATA VIA NETWORK

CROSS-REFERENCE TO RELATED APPLICATIONS

This application is a continuing application, filed under 35 U.S.C. §111(a), of International Application PCT/JP01/08431, filed Sep. 27, 2001.

BACKGROUND OF THE INVENTION

The present invention relates generally to efficiently downloading content data via a network, and more particularly to efficiently downloading multimedia content data via the Internet and displaying the data in a virtual three-dimensional space on a display device.

Today, users can, by using a browser program on a client personal computer (PC), download multimedia content data such as text, image and sound described in the HTML (Hyper Text Markup Language) and other languages from a Web server via a network such as the Internet to the PC, display it on a display device and produce sound via a speaker.

Various browser functions can be used for the download. For example, pieces of image data are downloaded to the client PC simultaneously or sequentially one by one in the order of occurrences of the HTML descriptions embedded in a particular previously displayed item of content. The image data can be downloaded in accordance with the progressive JPEG format or interlaced GIF format while concurrently displaying a temporary image in the process of being decompressed. It is possible to change images to be displayed by tracing links between a plurality of items of content, while thereby interrupting the downloading of the image data. By clicking on the display area in which a particular image is to be displayed, the order of capturing content data can be changed so as to capture the particular image data in the area earlier than others. In order to reduce the amount of image data to be downloaded, provisions can be adapted to first display a reduced image called a thumbnail, so that the original image to which the thumbnail linked is displayed by clicking on the thumbnail.

Recently, there has been development of three-dimensional Web browsers representative of three-dimensional Web content in a virtual three-dimensional space, and it is expected that a lot of three-dimensional Web content will be provided by Web servers over the Internet in the future. In viewing such three-dimensional content, a three-dimensional Web browser allows a user to zoom in and out an object representative of a given content image in a virtual three-dimensional space on a display, to thereby change his or her viewpoint relative to the object. The browser displays objects representative of images of all required items of content after having obtained such items of content.

Virtual three-dimensional display of content allows more content objects to be disposed in a virtual space than two-dimensional display of content by one dimension. Further, many virtual three-dimensional content objects are expressed with one or more polygons, and images are mapped as texture onto such objects. A lot of data is required to express a complex content object. Therefore, a user must wait for a long time before a lot of image data is downloaded over the network.

In the two-dimensional display of content, it is possible, when a particular item of Web content is displayed, to view another item of Web content by tracing links between items of Web content. A hyperlink indication is often embedded in Web content, and the user can be moved to another item of Web content by clicking on the hyperlink indication. The hyperlink has the advantage of permitting creation of an item of content to be linked to, independently of creation of an item of content to be linked from, so that an item of content at a physically distant location can be viewed through simple manipulation of the input device. In virtual three-dimensional display of content, however, the linking process by clicking on the hyperlink indication may be inconvenient.

A method has been developed for displaying objects representative of all hyperlinked items of content on the display based on the fact that a number of content objects can be disposed in virtual three-dimensional display of content. Such a method is disclosed, for example, by the inventors in Japanese Patent Publication JP 2000-172248 (A) published on Jun. 23, 2000, entitled "Electronic Information Display Method, Electronic Information Browsing Device and Electronic Information Browsing Program Storage Medium" (which corresponds to U.S. patent application Ser. No. 09/407,376 filed on Sep. 28, 1999). In the method and device, in accordance with the geometric relationship between a viewpoint of a user and an object representative of a subsequent item of content to be linked to, data of the subsequent item of content may be acquired.

SUMMARY OF THE INVENTION

In accordance with one aspect of the present invention, an information processing apparatus displays a plurality of linked items of content in a virtual space in accordance with field-of-view data. The information processing apparatus includes: first capturer means for capturing link description data; second capturer means for capturing content data associated with the description of an item of content contained in the captured link description data; image generator means for generating an image of the item of content to be disposed in the virtual space, in accordance with the captured content data; and determiner means for determining further data to be captured next in accordance with a condition contained in the captured link description data.

In an embodiment of the invention, the captured link description data may contain a disposition and an identification of further link description data, and a condition for capturing the further link description data. The further link description data may contain a disposition and an identification of an item of content.

In accordance with another aspect of the invention, a program is for use in an information processing apparatus and for displaying a plurality of linked items of content in a virtual space in accordance with field-of-view data. The program is operable to effect the step of capturing link description data; the step of capturing content data associated with the description of an item of content contained in the captured link description data; the step of generating an image of the item of content to be disposed in the virtual space, in accordance with the captured content data; and the step of determining further data to be captured next in accordance with a condition contained in the captured link description data.

In accordance with a further aspect of the invention, a method for displaying a plurality of linked items of content in a virtual space in accordance with field-of-view data comprises: the step of capturing link description data; the step of capturing content data associated with the description of an item of content contained in the captured link description data; the step of generating an image of the item of content to be disposed in the virtual space, in accordance with the captured content data; and the step of determining further data to be captured next in accordance with a condition contained in the captured link description data.

According to the invention, content data to be linked to can be efficiently captured to generate an image of the captured content data, and an image can be generated in accordance with a content creator's intention.

BRIEF DESCRIPTION OF THE DRAWINGS

FIG. 6 shows an example of a conventional link description file described in the structured language;

FIG. 8 shows an example of a link description file described with range tags in the structured language, in accordance with an embodiment of the present invention;

FIG. 9 shows an example of the link description file described with group tags in the structured language, in accordance with an embodiment of the invention;

FIG. 10 shows an example of the link description file described with attention tags in the structured language, in an embodiment of the invention.

DETAILED DESCRIPTION OF THE PREFERRED EMBODIMENTS

In the conventional method above, even if the data of the subsequent content to be linked to is large in size, the data is required to be captured over a network, which causes the user to wait for a long time during the capturing. In addition, only the user's viewpoint and field of view are used as required conditions for download. Thus, it is difficult to control the download at the client in accordance with the intent of the content creator. As a result, the displayed image generated in accordance with the downloaded content data may run counter to the intent of the content creator.

The inventors have recognized that it is efficient to determine a subsequent item of content to be captured and displayed, in accordance with the intent of a content creator, the amount of content data, and the geometric relationship between the viewpoint of a user and a current content object displayed in a three-dimensional virtual space on a display.

It is an object of the present invention to determine which content data is to be captured in accordance with a predetermined condition in order to display a corresponding item of content to be linked to.

It is another object of the invention to determine which content data is to be captured earlier in accordance with a predetermined condition in order to display a corresponding item of content to be linked to.

It is a further object of the invention to generate a content image in accordance with a predetermined condition in order to display a corresponding item of content to be linked to.

The present invention will be described with reference to a plurality of linked Web files of objects to be disposed in a virtual three-dimensional space. The Web file contains a content file, and a link description file which will be described later. A content file may include content, such as a single text document, a document containing text and graphics, an image, a stream of motion pictures, a three-dimensional image made up of a plurality of parts, an audio stream or the like. An object representative of such content is disposed in the virtual three-dimensional space, in accordance with the viewpoint and field of view of a user, the relative link relationship, and the size and shape of the content.

Figure 1:
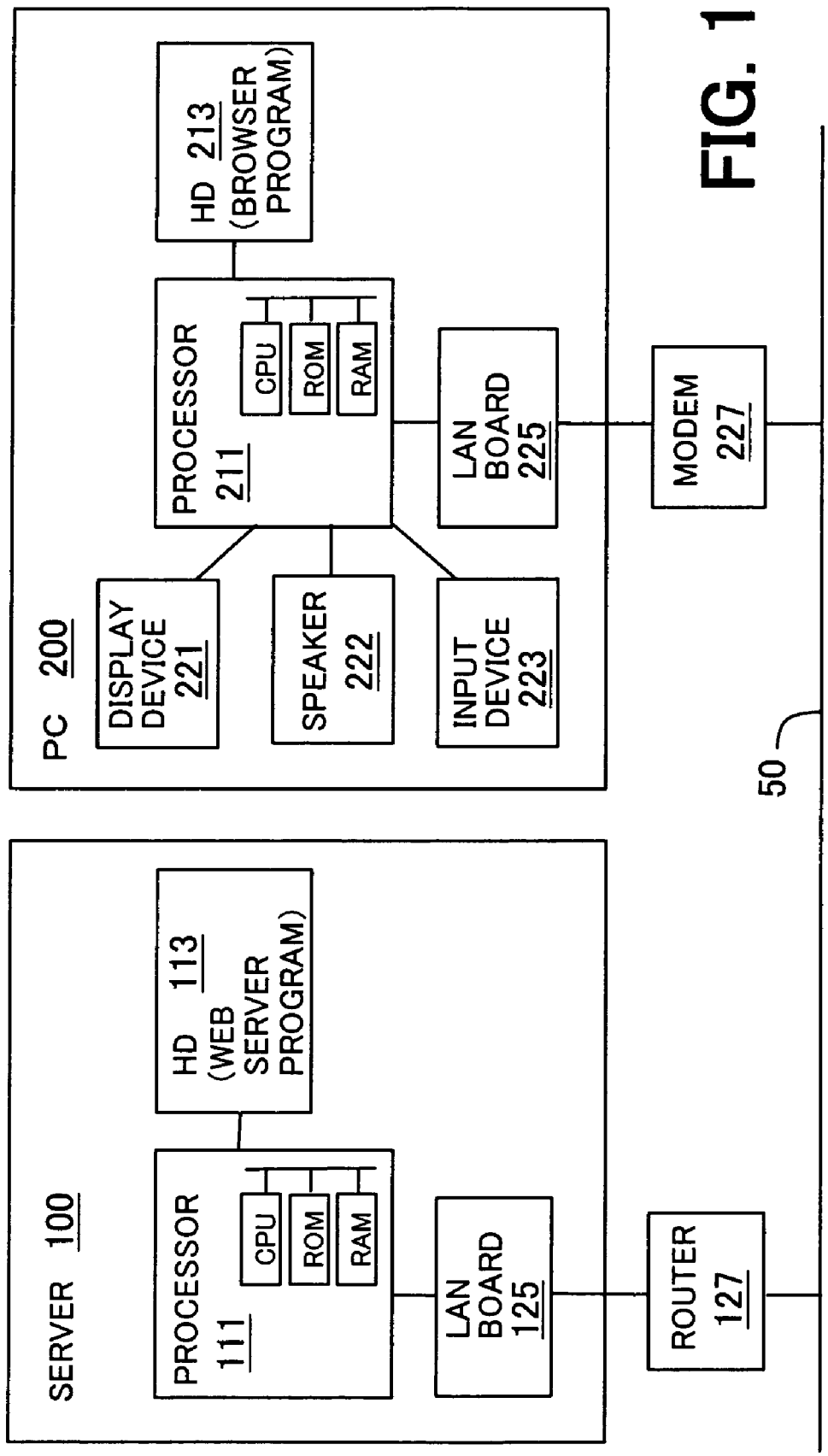
FIG. 1 shows a system configuration for use in an embodiment of the present invention for transmitting Web files from a Web server computer to a client personal computer over a network.

FIG. 1 shows a system configuration for use in the embodiment of the present invention, for transmitting Web files from a Web server computer 100 to a client personal computer (PC) 200 via a network 50. The network 50 typically consists of the Internet, a local area network (LAN), a telephone network including a mobile communication network, a cable TV network, a power line carrier communication network, a fiber optic network and/or the like.

The Web server computer 100 includes a processor 111, a hard disk memory 113 storing a plurality of computer programs including a Web server program, and a LAN board 125. The LAN board 125 is connected to the network 50 via a router 127. The processor 111 typically contains a CPU, a ROM and a RAM. The processor 111 provides the Web server functionality by running the Web server program thereon. The Web server functionality may be implemented in a dedicated processor as an integrated circuit. In response to a request as defined in compliance with the HTTP protocol from another computer, the computer 100 sends a Web file to the other computer over the network 50.

The client PC 200 includes a processor 211, a hard disk memory 213 storing a plurality of computer programs including a Web browser program, a display device 221, a speaker 222, an input device 223 including a keyboard and a mouse, and a LAN board 225. The LAN board 225 is connected to the network 50 via an ADSL modem 227. The processor 211 typically contains a CPU, a ROM and a RAM. The processor 211 provides the Web browser functionality by running the Web browser program thereon. The Web browser functionality may be implemented in a dedicated processor as an integrated circuit.

Figure 2:
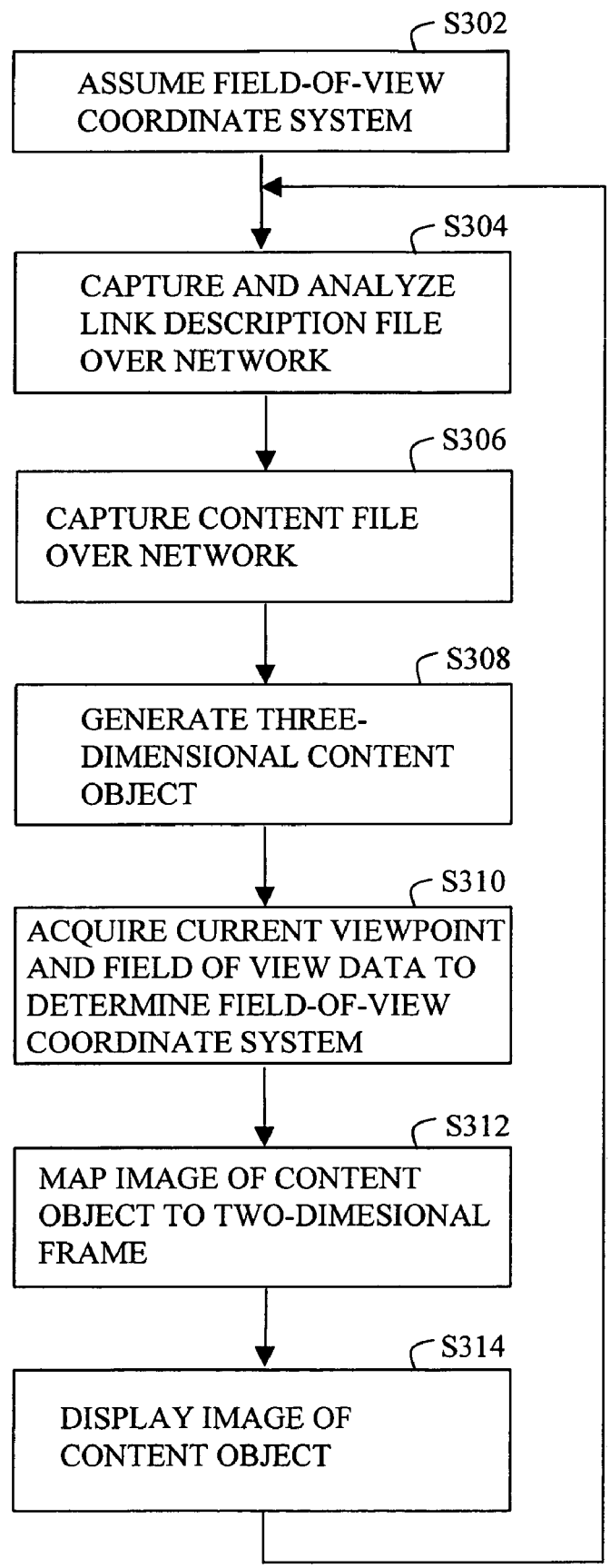
FIG. 2 shows a schematic flowchart executed by a processor in accordance with a conventional three-dimensional Web browser program.

FIG. 2 shows a schematic flowchart executed by the processor 211 in accordance with a conventional three-dimensional Web browser program. The detailed process of the conventional three-dimensional Web browser for displaying three-dimensional content objects described in the VRML (Virtual Reality Modeling Language) is well known.

Figure 3:
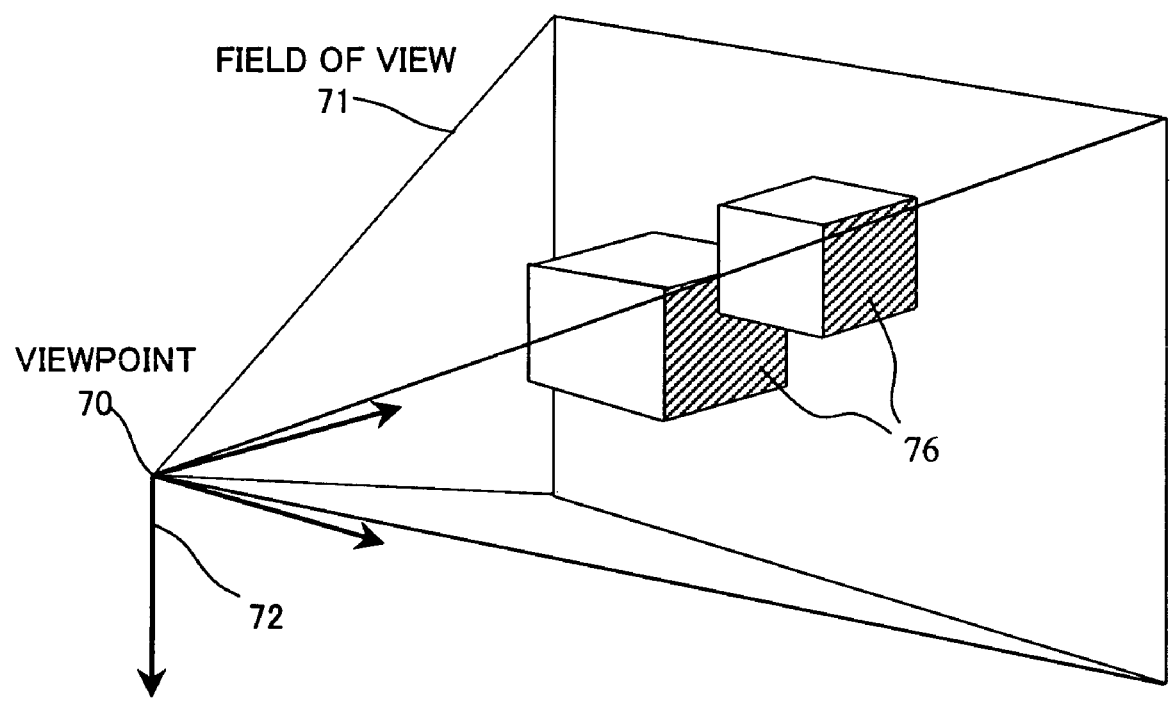
FIG. 3 illustrates the geometric relationship between a viewpoint and field of view of a user, and content objects, in a virtual three-dimensional space.

FIG. 3 illustrates the geometric relationship between a field of view 71 of the user and content objects 76 in the virtual three-dimensional space. In the figure, the field of view 71 is defined and the content objects 76 are disposed, in the virtual three-dimensional space. A fixed field-of-view coordinate system 72 is defined for the field of view 71. The field of view 71 has virtual three-dimensional position, angle and scale. A viewpoint 70 is defined at the origin of the field-of-view coordinate system 72.

Figure 4:
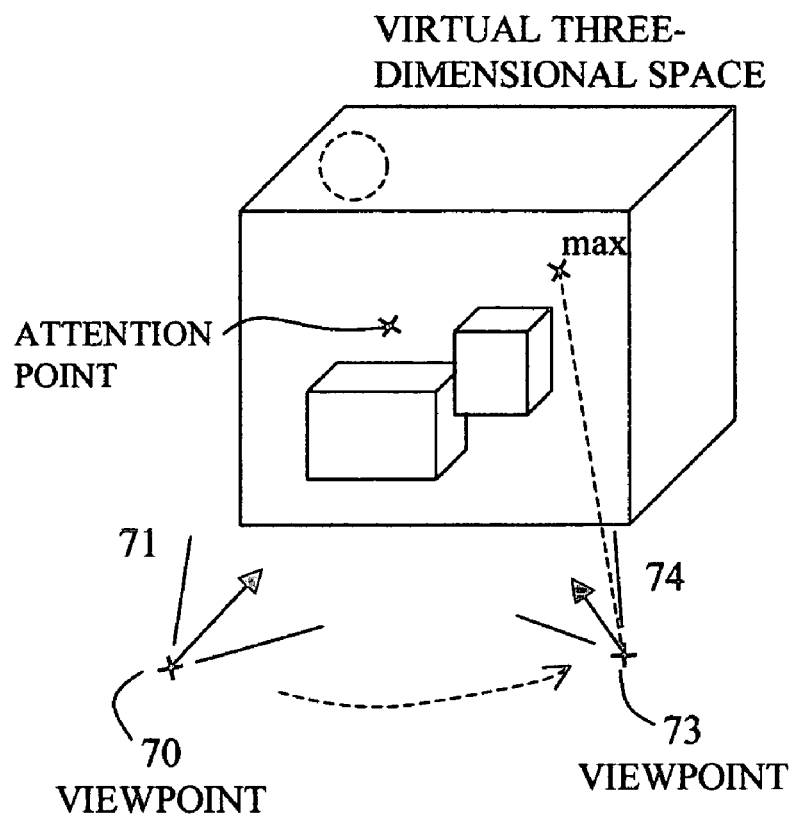
FIG. 4 shows movement of the user's viewpoint and field of view in the virtual three-dimensional space.

FIG. 4 shows movement of the user's viewpoint and field of view in the virtual three-dimensional space in response to the user input.

Referring back to FIG. 2, at Step 302, the processor 211 first assumes a reference viewpoint 70 and a reference field of view 71 as shown in FIG. 4, and then assumes, based thereon, a space of a reference virtual three-dimensional field-of-view coordinate system.

At Step 304, the processor 211 captures and analyzes a link description file described in a structured language such as the XML from the server 100 over the network 50. The link description file contains a disposition of a subsequent item of content to be linked to (i.e., a position, and a size and dimensions of the coordinate system) in the space of the virtual three-dimensional coordinate system of the file and an identification or URL of a file of the item of content to be linked to, and/or contains a disposition of the coordinate system of another subsequent link description file to be linked to in the space and an identification or URL of the other link description file to be linked to.

When the current link description file contains the description of a subsequent content file to be linked to, the processor 211 determines a disposition of an item of content thereof and identifies the URL of the content file. When the current link description file contains the description of another subsequent link description file to be linked to, the processor 211 determines the disposition of the coordinate system of the other link description file and identifies the URL of the other link description file.

At Step 306, the processor 211 captures the subsequent content file to be linked to described in the current link description file to be linked from, such as a file of image data, text data, motion image data, sound data or the like, from the server 100 over the network 50.

At Step 308, in accordance with the disposition of the item of content in the space of the current field-of-view coordinate system 72 and with data of the subsequent content file, the processor 211 generates a three-dimensional object representative of the item of content.

Using the input device 223 such as the mouse or the like, the user can operate the three-dimensional Web browser functionality to move the viewpoint and field of view for a current displayed image in the virtual three-dimensional space and zoon in and out the image. The input device 223 produces input data for movement of the viewpoint and field of view in accordance with the user operation and provides the input data to the processor 211. The processor 211 holds the field-of-view data, updates the field-of-view data in accordance with the input data, and determines and alters the field-of-view coordinate system on the display screen in accordance with the field-of-view data.

When the current position, angle and scale of the field of view are changed, the positions, angles and scales of all items of content and the file coordinate systems disposed in the virtual three-dimensional space are changed.

At Step 310, the processor 211 acquires the data of the viewpoint 73 and the field of view 74 resulted from the movement as shown in FIG. 4 entered by the input device 223, for example the mouse, to determine the coordinate system of the field of view as a current reference coordinate system.

At Step 312, the processor 211 maps or renders the images of the three-dimensional content objects 76 on to a two-dimensional frame memory area of the RAM in accordance with the reference coordinate system.

Figure 5:
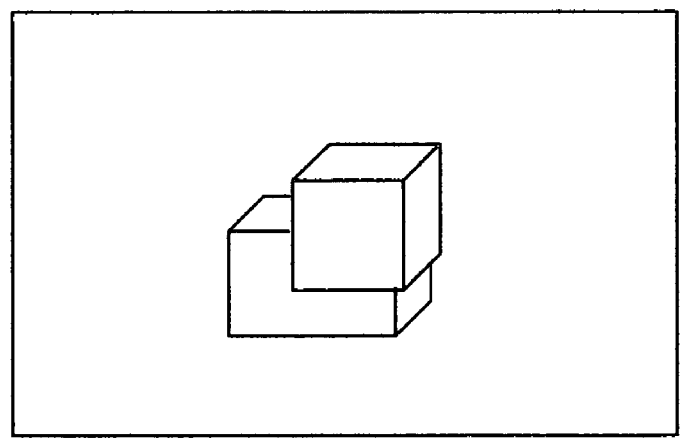
FIG. 5 shows a two-dimensional image displayed on a display device after moving the viewpoint and the field of view as shown in FIG. 4.

FIG. 5 shows a two-dimensional image displayed on the display 221 after the movement of the viewpoint 70 and the field of view 71 to the viewpoint 73 and the field of view 74 as shown in FIG. 4.

At Step 314, the processor 211 displays the two-dimensional frame image on the display device 221 as shown in FIG. 5.

Thus, when the user moves the field of view, the image displayed on the display 221 is moved by the three-dimensional Web browser functionality. When the user changes the angle, the viewing angles relative to the content objects are changed. When the user changes the scale, the image is enlarged or reduced.

Following Step 314, the procedure returns to Step 304, at which the processor 211 captures a further link description file. Steps 304 to 314 are repeated, until all the files to be linked to are captured. Once all the files are captured, only the displayed form of the two-dimensional image is changed in accordance with changes in the user's viewpoint and field of view.

Now, the link description file in the structured language for use in the embodiment is described in more detail below.

The link description file in the structured language contains a URL of a subsequent item of content to be linked to, the disposition, i.e. the position, angle and size (or scale), of the subsequent item of content to be linked to in the coordinate system of the current file to be linked from, and/or contains a URL of a subsequent link description file to be linked to and the disposition, i.e. the position, angle and scale, of the coordinate system of the subsequent link description file in the coordinate system of the current link description file. In accordance with these descriptions thereof, it is determined at what position, angle and scale the subsequent item of content and/or link description file to be linked to is disposed and displayed in the virtual three-dimensional space. It can be said that the disposition of the coordinate system of the subsequent file may at least partially represent a disposition of an item of content to be directly or indirectly linked to the subsequent file.

The link description file in the structured language may contain, for example, one virtual three-dimensional coordinate system, and dispositions and URLs of one or more three-dimensional items of content. The disposition of each item of content is expressed by the position, angle and size defined in the virtual three-dimensional coordinate system. The link description file may contain a plurality of virtual three-dimensional coordinate systems, and the dispositions and URLs of a plurality of items of content defined in the respective coordinate systems, and the three-dimensional browser functionality of the client 200 can convert such a plurality of coordinate systems into a single virtual three-dimensional coordinate system.

FIG. 6 shows an example of a conventional link description file described in the structured language. The file has an identification or name "example1.xml".

In the file, the descriptions placed between a pair of link tags "<Link" and "/>" at the bottom represent the disposition and URL of the coordinate system of the other subsequent link description file "example2.xml" to be linked to in the coordinate system of the current file "example1.xml" to be linked from.

A set of parameters "position-x", "position-y" and "position-z" indicates the coordinates (x, y, z) of the origin of the coordinate system of the other link description file in the coordinate system of the current link description file to be linked from. A parameter "rotation" represents the angle at which the x-y-axis plane of the coordinate system of the other file is to be rotated about the z-axis of the current coordinate system. A parameter "tilt" indicates the angle at which the rotated plane is to be rotated or tilted about the x-axis of the current coordinate system. A parameter "scale" represents the scale for the coordinate system of the other file in the current coordinate system. A parameter "source" indicates the source identification of the other file, and is described as the URL "http://www.fujitsu.com/ex/example2.xml" in the figure.

In the file shown in FIG. 6, the descriptions placed between a pair of link tags "<Image" and "/>" at the top indicate the disposition and URL of the item of content, i.e. the image "picture1.jpg", in the coordinate system of the current file.

Parameters "size-x" and "size-y" therebetween indicate the size of the image in the coordinate system of the current file. The item of three-dimensional content may further have a parameter "size-z". The parameter "source" represents an identification of the image file and is described as the URL "http://www.fujitsu.com/ex/picture1.jpg" in the figure.

The other link description file "example2.xml" may have a structure similar to that of the current link description file "example1.xml". The other link description file "example2.xml" may contain only the description of another item of content or only a further link description file.

Figure 7:
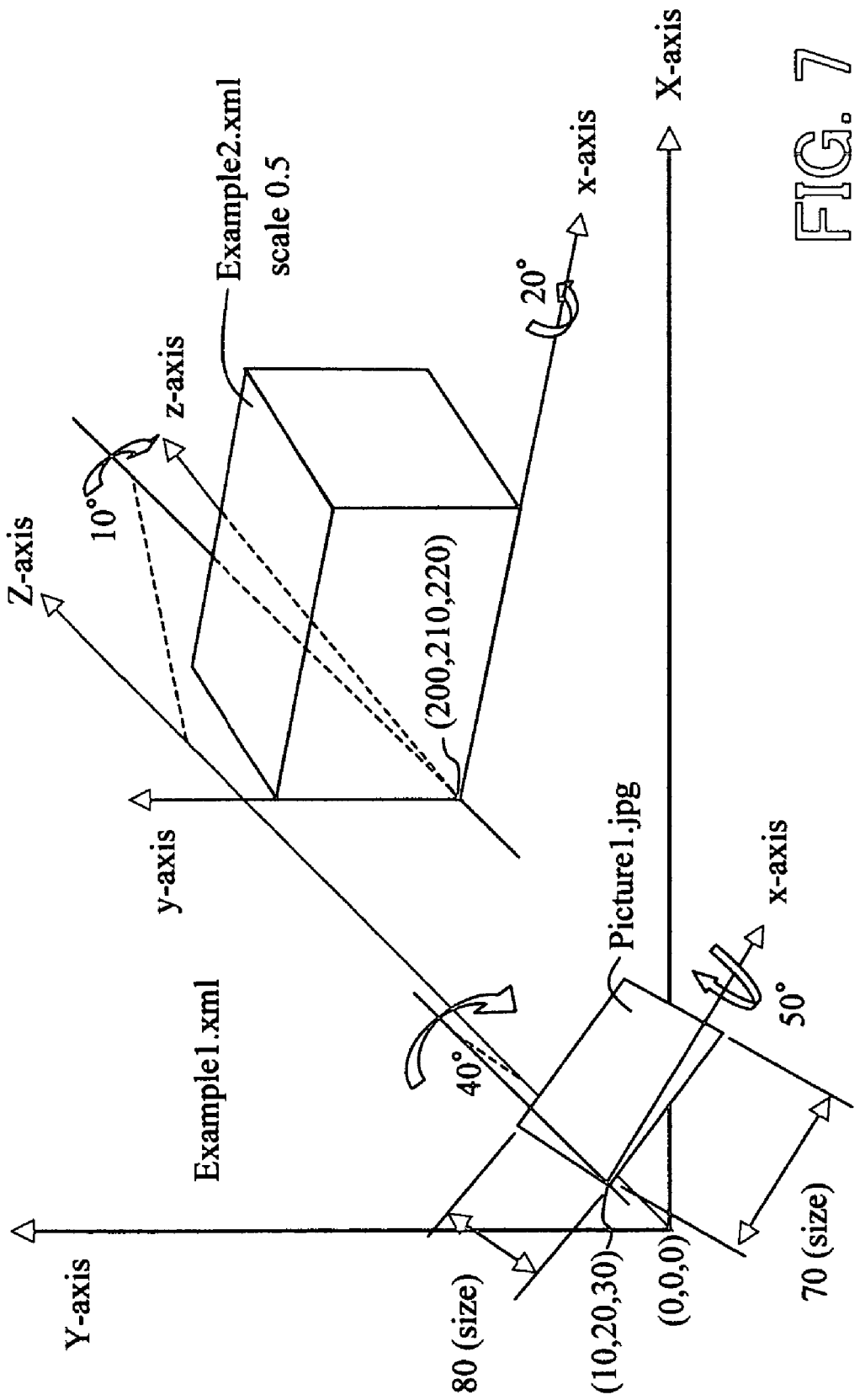
FIG. 7 shows the disposition of the coordinate system of a subsequent image data file to be linked to in the three-dimensional coordinate system of a current link description file shown in FIG. 6.

FIG. 7 shows the dispositions of the respective coordinate systems (x-axis, y-axis, z-axis) of the subsequent image data file "picture1.jpg" to be linked to and the other link description file "example2.xml" to be linked to in the three-dimensional coordinate system (X-axis, Y-axis, Z-axis) of the current file "example1.xml" shown in FIG. 6.

FIG. 8 shows an example of a link description file "example3.xml" described with range tags in the structured language in accordance with an embodiment of the present invention.

In the description file, a pair of range tags "<Level . . . >" and "</Level>" indicate a priority for capturing or presenting a link description file determined in accordance with the geometric metric (e.g., the distance, angle or scale) of the link description file relative to the user's viewpoint in the current field-of-view coordinate system. The range of the geometric metric relative to the viewpoint in the current field-of-view coordinate system is described between the range tags "<Level . . . >" and "</Level>." In this example, the metric is distance, and the parameters "distmin" and "distmax" within the range tags represent the minimum and maximum values respectively in the predetermined range of distance from the viewpoint.

The link tags "<Link . . . />" following the range tags indicate that, when the origin of the coordinate system of another link description file indicated with the link tags is located within the predetermined metric range, the other link description file is to be captured preferentially. In other words, the link tags indicate that the content data described in the other link description file indicated within the link tags is captured, if the disposition of the other link description file satisfies the predetermined metric range condition. Using the URL of the content file contained in the other link description file within the link tags, the content file is captured over the network 50 and is used to display the item of content in the disposition described in the other link description file. When the disposition of the item of content per se in the current field-of-view coordinate system falls within the predetermined metric range thereof, the content image in the captured content file is actually generated and displayed.

Sublink tags "<Sublink . . . />" within the range tags indicate that another link description file indicated with the link tags is alternatively to be captured, when the origin of the coordinate system of the other link description file is located outside the predetermined metric range. In other words, the sublink tags indicate that, if the disposition of the coordinate system of the alternative subsequent link description file does not satisfy the condition of the predetermined metric range, substitute content data described in the alternative link description file indicated within the sublink tags is alternatively captured. Using the URL of the substitute content file contained in the alternative link description file, the substitute content file is captured over the network 50 and used to alternatively display the substitute item of content in the disposition described in the other link description file. When the disposition of the item of content per se in the current field-of-view coordinate system falls outside the predetermined metric range, a content image in the substitute content file is actually generated and displayed.

If there are no sublink tags in the current link description file "example3.xml" and if the coordinate system of the different link description file indicated with the link tags is located outside the predetermined metric range, nothing is displayed in the disposition of the coordinate system.

FIG. 9 shows an example of the link description file "example4.xml" described with group tags in the structured language in accordance with an embodiment of the invention.

The group tags "<GROUP>" and "</GROUP>" indicate a plurality of other subsequent grouped link description files to be linked to. The link tags placed between these tags represent the other grouped link description files to be linked to, and the arrangement order of the pairs of link tags indicates the priority order of capturing the files in the group.

FIG. 10 shows an example of the link description file "example5.xml" described with attention tags in structured language in accordance with an embodiment of the invention.

The attention tags "<ViewPoint . . . />" indicate the location of the point designed to draw the attention of the user. The set of parameters "position-x", "position-y" and "position-z" indicates the location of the coordinates of the attention point in the coordinate system of the current link description file "example5.xml". The closer the content object is to the attention point, the higher priority the object is displayed at.

Figure 11A:
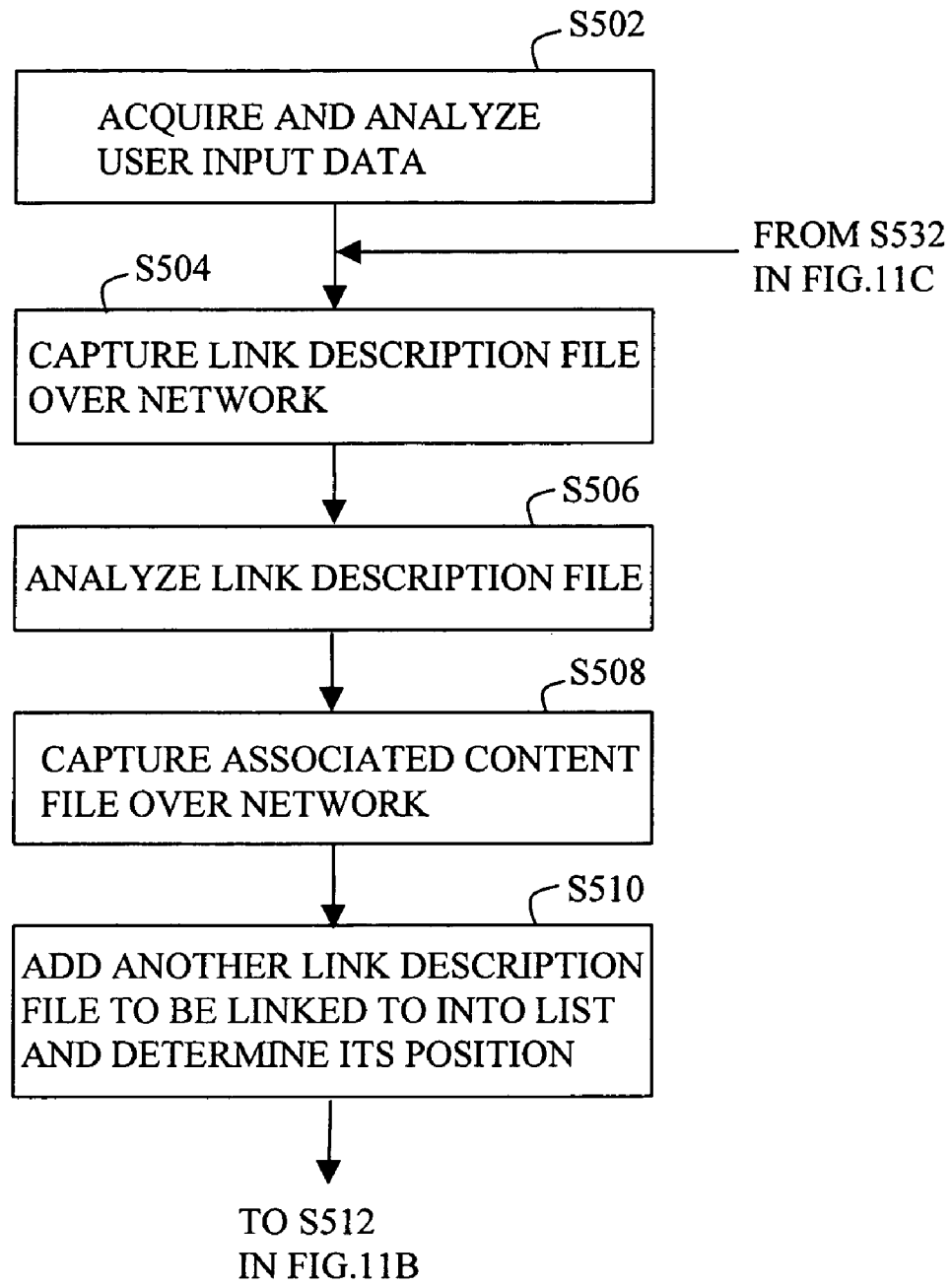
FIGS. 11A, 11B and 11C show a schematic flowchart for the three-dimensional Web browser functionality executed by the processor of the PC, in accordance with the embodiment of the invention.
Figure 11B:
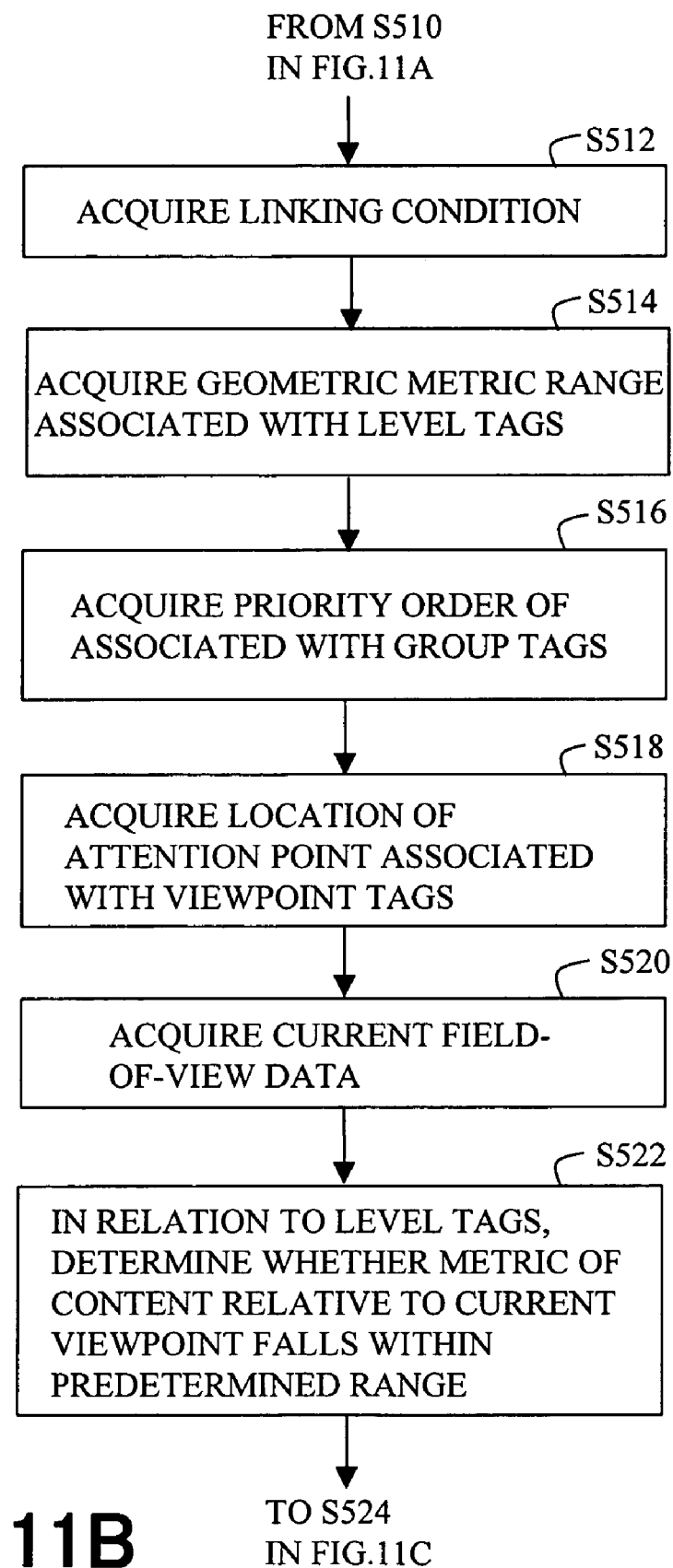
Figure 11C:
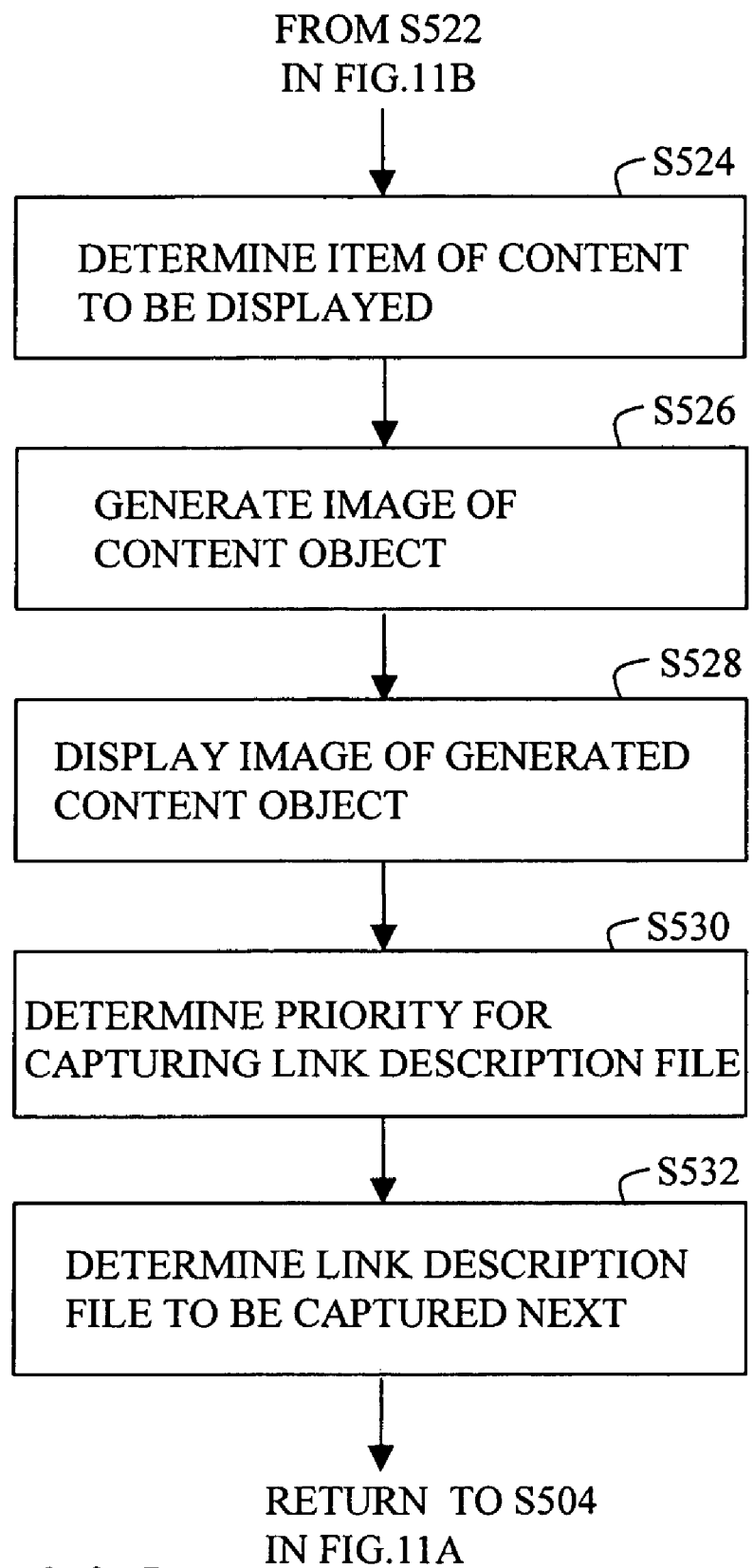

FIGS. 11A, 11B and 11C show a schematic flowchart for the three-dimensional Web browser functionality executed by the processor 211 of the PC 200 in accordance with the embodiment of the present invention. It is apparent to those skilled in the art that the functions of the steps in FIGS. 11A, 11B and 11C may be implemented in hardware as one or more integrated circuits and possibly in combination with other circuits.

Referring to FIG. 11A, at Step 502, the processor 211 acquires and analyzes input data from the input device 221 including the keyboard and mouse manipulated by the user in accordance with the three-dimensional Web browser program.

The processor 211 receives a URL from the input device 221 at Step 502, and then acquires a new link description file described in the structured language such as the XML from the server 100 over the network 50 at Step 504.

At Step 506, the processor 211 analyzes the current acquired link description file. If the description of an associated content file is contained in the current link description file, the processor 211 identifies a URL of the associated content file, such as image data file, required to generate a three-dimensional object image representing a corresponding item of content. If the description of another subsequent link description file to be linked to that is described with link tags is contained in the current link description file, the processor 211 identifies the URL of the other link description file.

At Step 506, if it is determined that the description of an associated content file is contained in the current link description file, the processor 211 at Step 508 captures the associated content file thereof from the server 100 over the network. In this case, if the content file is a file of image data, the processor 211 can capture the data by specifying a resolution thereof. Next, the processor 211 determines the disposition, i.e., the position, angle and size (or scale) of the item of content in the current field-of-view coordinate system. Even if a higher resolution is required for the image data in the current field-of-view coordinate system than that specified for the previously captured image data, the processor 211 can capture the data by specifying such a higher resolution thereof. In this case, only additional data may be captured that is required to obtain such a higher resolution.

Now, the method for downloading image data by specifying a resolution thereof is described below. The scale of a coordinate system of a link description file containing a link to a file of image data, i.e., requiring a file of image data, is converted into the scale in the current field-of-view coordinate system. This conversion can be calculated by tracing successive links and successively multiplying each scale value of the subsequent file with the product of the respective scale values of the current and previous files to be linked from, until the scale value of the file with the initial URL inputted by the user is multiplied with the product. The product of these scale values is multiplied by the size of "size-x", "size-y" and "size-z" which is an image attribute of the image tags that denotes an image file, to thereby determine a proper resolution for the current viewpoint. Thus, the set of pixel values for the image to be displayed by the three-dimensional Web browser are determined. In order to capture the image data in accordance with the calculation, it is necessary to download image data by specifying the resolution.

For example, applying the JPEG 2000 format recommended by the International Standardization Organization (ISO) to the image data allows download of part of the image data over the network by specifying one of multi-resolutions without capturing all the image data. With this format, it is possible to obtain an image with a resolution close to that obtained by the resolution calculation. Low resolution, although resulting in a low definition image, is sufficient when the image is displayed in a small size on the display device.

If it is determined at Step 506 that the description of another link description file is contained in the current link description file, the processor 211 at Step 510 determines the disposition, i.e. the position, angle and scale, of the coordinate system of the other link description file in the current field-of-view coordinate system, by retrieving a URL of the other link description file and putting it into a list of URLs to store the list in the RAM working area or adding the URL to the list of URLs in the area.

Next, referring to FIG. 11B, the processor 211 at Step 512 acquires a linking condition or a presentation condition, if any, for another description file in the current link description file.

If the range tags are contained as a linking condition in the current link description file as illustrated in FIG. 8, the processor 211 at Step 514 acquires the geometric metric range relative to the viewpoint, for example, the maximum value "distmax" and the minimum value "distmin" of the distance range in FIG. 8 and stores the values in the RAM work area. At Step 514, the processor 211 may add, to the list of URLs, the URL of the other link description file within the link tags, instead of doing so at Step 506 as described above. Further, if the sublink tags are contained in the current link description file, the processor 211 may add a URL of a further link description file within the tags to the list as an alternative file to be linked to.

If the group tags as shown in FIG. 9 are contained as a linking condition, the processor 211 at Step 516 acquires the priority order of linking or presenting a group of other subsequent link description files to be linked to within the group tags, and stores the priority order in the RAM. At Step 516, the processor 211 may add, to the list, the URLs of the other subsequent link description files within the group tags, instead of doing so at Step 506.

If the attention tags as shown in FIG. 10 are contained as a linking condition, the processor 211 acquires the location data of the attention point and stores it in the RAM at Step 518.

At Step 520, the processor 211 acquires the current viewpoint and field-of-view data that is inputted by the user, and determines the current position, angle and scale of the user's field-of-view coordinate system in the virtual three-dimensional space.

At Step 522, the processor 211 calculates, in relation to the range tags, the geometric metric of the coordinate system of another link description file relative to the current viewpoint and/or field of view in the virtual three dimensional space, the geometric metric of the associated item of content relative to the coordinate system, and thereby the geometric metric of the associated item of content relative to the viewpoint and/or field of view. In the example of FIG. 8, the processor 211 calculates the distance from the current viewpoint to the origin of the coordinate system of another link description file, the distance from the origin of the coordinate system of the other link description file to the origin of the coordinate system of an item of content to be linked from the other file, and thereby the distance from the viewpoint to the origin of the coordinate system of the item of content. For this purpose, if the other link description file is linked to the item of content through further link description files, the processor 211 traces links thereof successively until it reaches the coordinate system of the item of content, and determines the geometric metric of the item of content relative to the viewpoint and/or field of view.

Next, the processor 211 determines whether the geometric metric of the item of content relative to the field of view falls within the predetermined range, for instance, whether the distance falls within the range between the maximum value "distmax" and the minimum value "distmin", and stores the determination in the RAM.

Next, referring to FIG. 11C, the processor 211 at Step 524 determines, in accordance with the determination, whether a given item of content to be linked to that is associated with range tags is to be displayed and which item of content is to be displayed.

At Step 524, the processor 211 further determines to display, among items of content associated with a group of respective link description files within the group tags, only an item of content of the last or most recently captured content file in the group, so that an item of content of the previous content file in the group is not displayed. Such determination is made, for example, if the group contains a plurality of link description files which are associated with a plurality of items of content located substantially at the same coordinates. For example, if a plurality of image files represented as the same object is grouped within the group tags so that the image file with a lower priority contains more detailed image data, thus only one of the image files is to be displayed.

Alternatively, the processor 211 may determine to display, among items of content associated with a group of respective link description files within the group tags, all the items of content of the content files in the group that are captured up to the present. Such a determination is made, for example, if the group contains a plurality of link description files which are associated with a plurality of items of content located at different sets of coordinates.

At Step 526, the processor 211 generates an image of objects of the items of content to be displayed using the captured required content files in accordance with the position, angle and scale of the current field-of-view coordinate system determined at Step 520 and with the determination made at Step 524, and stores the generated image in the RAM two-dimensional frame memory area.

At Step 528, the processor 211 displays the generated image of the content objects on the display 221.

At Step 530, the processor 211 determines, in a manner described later, the priorities for capturing uncaptured link description files to be linked to, in accordance with the viewpoint and field-of-view data, the link description file, the alternative link description file, the priority order of link description files in a group, the location of the attention point, the determination and the like, as described above.

At Step 532, the processor 211 determines, among uncaptured link description files to be linked to, the file with the highest priority as a link description file to be captured next. Thus, if the link description file to be captured next contains the description of a content file, the content file will be captured at Step 508 which will be repeated later.

Next, determination of priorities at Step 530 will be described. First, the processor 211 converts the sets of coordinates of all the captured link description files and the sets of coordinates of the items of content thereof into those in the virtual three-dimensional space of the field-of-view. Such conversion is a typical coordinate conversion method and is known to those skilled in the art.

Next, the processor 211 calculates, in relation to the range tags, a geometric metric, e.g. distance, of the origin of the coordinate system of the link description files associated with the range tags relative to the current viewpoint. The processor 211 determines whether the metric falls within the range between the minimum and maximum values. If the metric falls within the range, the processor 211 assigns a higher priority (e.g., 8) to the link description file. If the metric does not fall within the range, the processor 211 assigns a lower priority (e.g., 2) to it. If an alternative description file is available, a lower priority (e.g., 4) is assigned to the alternative description file and the lowest priority (e.g., 2) is assigned to the original description file. In this case, alternatively, no priority may be assigned to the original description file.

The geometric metric relative to the viewpoint may be angle or scale. If the metric is the angle, the priority of another subsequent link description file to be linked to may be determined in accordance with the angular difference between the angle of the viewpoint relative to the link description file in the current field-of-view coordinate system and a given direction such as the z-axis direction at the coordinates of the file or the line perpendicular to the main surface of an item of content associated therewith, i.e., in accordance with whether the angular orientation of the item of content relative to the line of sight falls within a predetermined range of angles. If the metric is the scale, the priority of another link description file to be captured next may be determined in accordance with whether the scale of the link description file or the size of the displayed content associated therewith falls within a predetermined range.

The processor 211 assigns, in relation to the group tags, the highest priority (e.g., 8) to a link description file with the highest priority order among uncaptured files within the group tags.

The processor 211 determines, in relation to the attention tags, the location of the attention point within the attention tags, and the distances between the attention point and the sets of coordinates of uncaptured link description files with URLs in the list, in the current field-of-view coordinate system. The processor 211 then assigns higher priorities (e.g., 8, 6, 4, . . . ) to uncaptured link description files in the list that are closer to the attention point. The highest priority (e.g., 10) may be assigned to the file that is closest to the attention point among all the files with URLs in the list. This ensures that higher priorities are assigned to items of content closer to the attention point.

The processor 211 assigns a high priority (e.g., 8) to a link description file with no linking condition.

A designer of the three-dimensional Web browser determines what magnitudes of priorities are assigned to which link description files in accordance with respective linking conditions in Step 530.

Next, the processor 211 calculates the distances between the current viewpoint and the positions of the link description files with assigned priorities, and adds further higher magnitudes of priorities (e.g., 7, 5, 3, 1) to the assigned priorities of the files with shorter distances to thereby determine the resultant priorities. In this manner, the determination of resultant priorities allows higher download priorities to be assigned to items of content that are closer to the user's viewpoint.

The processor 211 of the client 200 can download, at Step 504 in the next cycle, link description files from the server 100 over the network 50 in accordance with the priorities, and download, at Step 508, content files associated with the link description files. This allows easiest-to-see or most outstanding items of content to be downloaded preferentially for displaying.

The range tags set by the content creator allow determination of items of content to be downloaded, in accordance with a metric relative to the user's viewpoint, for example a distance from the viewpoint. This ensures that original detailed image data is downloaded for displaying, for an item of content disposed at location which is easy to see from the viewpoint, while, for an item of content disposed at a location which is difficult to see, more schematic image data may be downloaded for displaying, or no data may be downloaded and hence no image may be displayed.

The group tags set by the content creator allow preparation of items of content with various amounts of data, and allow content files with smaller amounts of data to be downloaded earlier by assigning higher priorities to link description files to be linked to the items of content with the smaller amounts of data. This reduces wait time for the user to view, when the user enters a new URL.

The attention tags set by the content creator assign higher priorities to items of content closer to the location on which attention is sought to be focused by the content creator. In addition, it is possible, by downloading and displaying those items of content in the order of the priorities, to display, ahead of others, the item of content closest to the location on which attention is sought to be focused, thus effectively drawing the user's interest.

The range, group and attention tags may be used in combination. For instance, if the range and attention tags are used in combination together with a plurality of attention points, the priorities may be determined by concurrently applying the distance linking condition to the distances between the viewpoint and the attention points. When range and attention tags are used in combination, to avoid preferential download starting from an attention point to a farther distance even if the attention point is located deeper in the screen and does not affect the display, the priorities of the items of content or whether to display the items of content may be determined in accordance with the distance from the viewpoint to the attention point.

After Step 532 is executed, the procedure returns to Step 504, at which the processor 211 captures a next new link description file in accordance with the priority assigned thereto.

The processing at Steps 504 to 532 is repeated until all new link description and content files associated with the Web site entered by the user are captured. Once all the files are captured, only the display form thereof will be altered in accordance with changes in the user's viewpoint and field of view. The capturing is interrupted if the user moves to a further Web site before all of the associated link description and content files are captured.

In the embodiments, the present invention has been described in connection with downloading Web files over the network. However, the invention is not limited to such downloading of Web files, but can be also applied, for example, to reading content files from a source of content data at limited read-out rates for displaying items of content thereof in the three-dimensional form.

The above-described embodiments are only typical examples, and their modifications and variations are apparent to those skilled in the art. It is apparent that those skilled in the art can make various modifications to the above-described embodiments without departing from the principle of the invention and the accompanying claims.

What is claimed is:

1. An information processing apparatus for displaying a plurality of linked items of content in a virtual space in accordance with field-of-view data, said information processing apparatus comprising:
    a first capturing unit for capturing link description data which contains a location of an item of content and an identification of the item, and contains a location of an attention point designed to draw attention to the user;
    a determining unit to display the item of content when a distance between the location of the item and the location of the attention point is within a predetermined range, and a distance between the location of the attention point and the location of a view point in the current field-of-view coordinate system is within a predetermined range;
    a second capturing unit for capturing content data associated with the identification of the item determined by the determining unit; and;
    an image generating unit for generating an image of said item of content to be disposed in said virtual space, in accordance with said captured content data.

2. The information processing apparatus according to claim 1, wherein said captured link description data contains dispositions of a plurality of items of content and contains as said condition a priority order of capturing said plurality of sets of content data.

3. The information processing apparatus according to claim 1, wherein said captured link description data contains as said condition a reference position for preferentially capturing a closer item of content.

4. The information processing apparatus according to claim 1, wherein said captured link description data contains the descriptions of links to a plurality of items of content with different sizes.

5. The information processing apparatus according to claim 1, wherein said second capturing unit determines a necessary resolution in accordance with the geometric relationship between the current viewpoint and the item of content and captures said content data at said resolution.

6. The information processing apparatus according to claim 1, wherein said determining unit determines priorities for capturing a plurality of sets of content data in accordance with said condition.

7. The information processing apparatus according to claim 1, wherein, when the geometric relationship between the current viewpoint and said item of content satisfies said condition, said image generating unit generates an image of said item of content.

8. The information processing apparatus according to claim 1, wherein, when a group of items of content has a priority order, said image generating unit generates an image of a last captured item of content among said plurality of items of content.

9. The information processing apparatus according to claim 1, wherein said first and second capturing units capture data over a network.

10. A program stored on a computer-readable storage for use in an information processing apparatus and for displaying a plurality of linked items of content in a virtual space in accordance with field-of-view data, said program, which when executed by a computer, causes the computer to perform a process comprising:
    capturing link description data which contains a location of an item of content and an identification of the item, and contains a location of an attention point designed to draw attention to the user;
    determining to display the item of content when a distance between the location of the item and the location of the attention point is within a predetermined range, and a distance between the location of the attention point and a location of a view point in the current field-of-view coordinate system is within a predetermined range;
    capturing content data associated with the identification of the item determined by said determining; and;
    generating an image of said item of content to be disposed in said virtual space, in accordance with said captured content data.

11. The program product according to claim 10, wherein said captured link description data contains dispositions of a plurality of items of content and contains as said condition a priority order of capturing said plurality of sets of content data.

12. The program product according to claim 10, wherein said captured link description data contains as said condition a reference position for preferentially capturing a closer item of content.

13. The program product according to claim 10, wherein said capturing content data comprises determining a necessary resolution in accordance with the geometric relationship between the current viewpoint and the item of content and captures said content data at said resolution.

14. The program product according to claim 10, wherein said determining comprises determining priorities for capturing a plurality of sets of content data in accordance with said condition.

15. The program product according to claim 10, wherein, said generating an image comprises generating an image of said item of content, when the geometric relationship between the current viewpoint and said item of content satisfies said condition.

16. The program product according to claim 10, wherein, said generating an image comprises generating an image of a last captured item of content among a plurality of items of content, when said group of items of content has a priority order.

17. A method for displaying a plurality of linked items of content in a virtual space in accordance with field-of-view data, said method comprising:

capturing link description data which contains a location of an item of content and an identification of the item, and contains a location of an attention point designed to draw attention of the user;

determining to display the item of content when, a distance between the location of the item and the location of the attention point is within a predetermined range, and a distance between the location of the attention point and a location of a view point in the current field-of-view coordinate system is within a predetermined range;

capturing content data associated with the identification of the item determined by said determining; and;

generating an image of said item of content to be disposed in said virtual space, in accordance with said captured content data.

* * * * *